(12) United States Patent
Heyn

(10) Patent No.: US 10,773,322 B2
(45) Date of Patent: Sep. 15, 2020

(54) GEARING METHOD WITH TOOTH FINISHING AND COMBINATION TOOL THEREFOR

(71) Applicant: Profilator GmbH & Co. KG, Wuppertal (DE)

(72) Inventor: Stefan Heyn, Sprockhövel (DE)

(73) Assignee: Profilator GmbH & Co. KG, Wuppertal (DE)

( * ) Notice: Subject to any disclaimer, the term of this patent is extended or adjusted under 35 U.S.C. 154(b) by 0 days.

(21) Appl. No.: 15/560,062

(22) PCT Filed: Mar. 2, 2016

(86) PCT No.: PCT/EP2016/054437
§ 371 (c)(1),
(2) Date: Sep. 20, 2017

(87) PCT Pub. No.: WO2016/150666
PCT Pub. Date: Sep. 29, 2016

(65) Prior Publication Data
US 2018/0079019 A1    Mar. 22, 2018

(30) Foreign Application Priority Data
Mar. 20, 2015   (DE) .......................... 10 2015 104 242

(51) Int. Cl.
*B23F 5/16*    (2006.01)
*B23F 21/00*   (2006.01)
(Continued)

(52) U.S. Cl.
CPC ............ *B23F 5/163* (2013.01); *B23F 17/006* (2013.01); *B23F 19/107* (2013.01);
(Continued)

(58) Field of Classification Search
CPC ...... B23F 5/163; B23F 17/006; B23F 21/005; Y10T 409/105565; Y10T 409/105406;
(Continued)

(56) References Cited

U.S. PATENT DOCUMENTS 2,214,225 A    9/1940  Drummond
3,931,754 A *  1/1976  Nishijima ............... B23F 5/163
                                                    409/35
(Continued)

FOREIGN PATENT DOCUMENTS

DE           2654177 A1    6/1978
DE    19918289-b23fA1  * 10/2000 .............. B23F 17/00
(Continued)

OTHER PUBLICATIONS

Machine Translation of DE 10305752 A1, which DE '752 was published Oct. 2004.*
(Continued)

*Primary Examiner* — Erica E Cadugan
(74) *Attorney, Agent, or Firm* — Whitmyer IP Group LLC

(57) ABSTRACT

A method for producing gears, wherein in a first step a set of teeth is formed by means of a skiving wheel rotationally driven by a tool spindle in a workpiece gear rotationally driven synchronously thereto by a workpiece spindle, wherein the workpiece spindle and the tool spindle are at an axis intersection angle to each other and the advancement occurs in the tooth-flank extension direction, and wherein in a second step at least some teeth of the set of teeth are machined by means of a tooth-machining tool. A combined tool is used, in the case of which the toothmachining tool and the skiving wheel are fixedly connected to each other. Between the two steps, the combined tool remains connected to the tool spindle and the workpiece gear remains connected to the workpiece spindle. Between the two steps,
(Continued)

merely the relative position of the tool spindle in relation to the workpiece spindle and the rotational speed ratio of the two spindles are changed.

7 Claims, 5 Drawing Sheets

(51) Int. Cl.
| | | |
|---|---|---|
| *B23F 19/10* | (2006.01) | |
| *B23F 23/12* | (2006.01) | |
| *B23F 17/00* | (2006.01) | |
| *B23P 13/02* | (2006.01) | |
| *B23P 15/14* | (2006.01) | |

(52) U.S. Cl.
CPC ........ *B23F 21/005* (2013.01); *B23F 23/1237* (2013.01); *B23P 13/02* (2013.01); *B23P 15/14* (2013.01); *Y10T 29/5168* (2015.01); *Y10T 29/5176* (2015.01); *Y10T 409/10795* (2015.01); *Y10T 409/101272* (2015.01); *Y10T 409/105565* (2015.01); *Y10T 409/108586* (2015.01)

(58) Field of Classification Search
CPC . Y10T 409/108904; Y10T 409/108586; Y10T 409/108427; Y10T 409/10795; Y10T 409/5176
USPC .............. 409/36, 35, 57, 55, 54, 51; 29/56.5
See application file for complete search history.

(56) References Cited

U.S. PATENT DOCUMENTS

| | | | |
|---|---|---|---|
| 4,726,720 A | 2/1988 | Lieser | |
| 8,523,634 B2* | 9/2013 | Woelfel | B23F 1/02 409/192 |
| 8,732,937 B2 | 5/2014 | Prock et al. | |
| 2006/0174464 A1* | 8/2006 | Fitzgerald | B23C 3/12 29/56.5 |
| 2009/0142153 A1* | 6/2009 | Prock | B23F 5/163 409/12 |
| 2017/0072485 A1* | 3/2017 | Weppelmann | B23F 19/102 |
| 2018/0111209 A1* | 4/2018 | Prock | B23F 21/005 |
| 2018/0345393 A1* | 12/2018 | Weixler | B23F 19/104 |

FOREIGN PATENT DOCUMENTS

| | | | |
|---|---|---|---|
| DE | 10305752 A1 | 10/2004 | |
| DE | 19964396 B4 | 10/2009 | |
| DE | 102008037514 A1 | 5/2010 | |
| DE | 102014008475 A1 * | 12/2015 | |
| EP | 3272448 A1 * | 1/2018 | ............ B23F 21/005 |
| WO | 2015185186 A1 | 12/2015 | |

OTHER PUBLICATIONS

Article from "Gear Technology", titled "Using Hobs for Skiving; A Pre-Finish and Finishing Solution", by William E. McElroy, pp. 43-45, May/Jun. 1993 edition.*
Article from "Gear Technology", titled "Hard Gear Processing with Skiving Hobs", by William E. Loy, pp. 9-14, Mar./Apr. 1985 edition.*
Machine Translation of DE 19918289 A1, which DeE '289 was published Oct. 2000.*
Listing of file contents (as of Jan. 28, 2020) for German Patent Application No. 102014008475.2 from the German Patent Office Website at https://register.dpma.de/DPMAregister/pat/PatAkteneinsicht?akz=1020140084752, which application was filed Jun. 5, 2014.*
Machine Translation of DE 102014008475 A1, which DE '475 was published Dec. 17, 2015.*
Application DE 102014008475.2, including specification, claims, abstract, and drawings, as filed at the German Patent Office dated Jun. 5, 2014.*
"Frasen und Entgraten in einem Arbeitsgang. Chamfer-Cut Cutting and Deburring in One Process. Chamber Cut" Published: Jan. 1, 2014; pp. 1-6. URL:http://frezyslimakowe.pl/pliki/chamfercut.pdf.
International Search Report and Wntten Opinion, Application No. PCT/EP2016/054437, Completed Date: May 18, 2016; dated May 31, 2016, 12 Pages.
Translation of International Search Report, Application No. PCT/EP2016/054437, Completed Date: May 18, 2016; dated May 31, 2016, 3 Pages.
Translation of Written Opinion, Application No. PCT/EP2016/054437, Completed Date: Mar. 2, 2016, 9 Pages.
"Abdachen und Verzahnen in einer Aufspannung Herstellung von Zahnradem und verzahnten Bauteilen" Carl Hanser Verlag, Munchen, Germany, pp. 56-57, published Nov. 1, 2013 2 Pages.

* cited by examiner

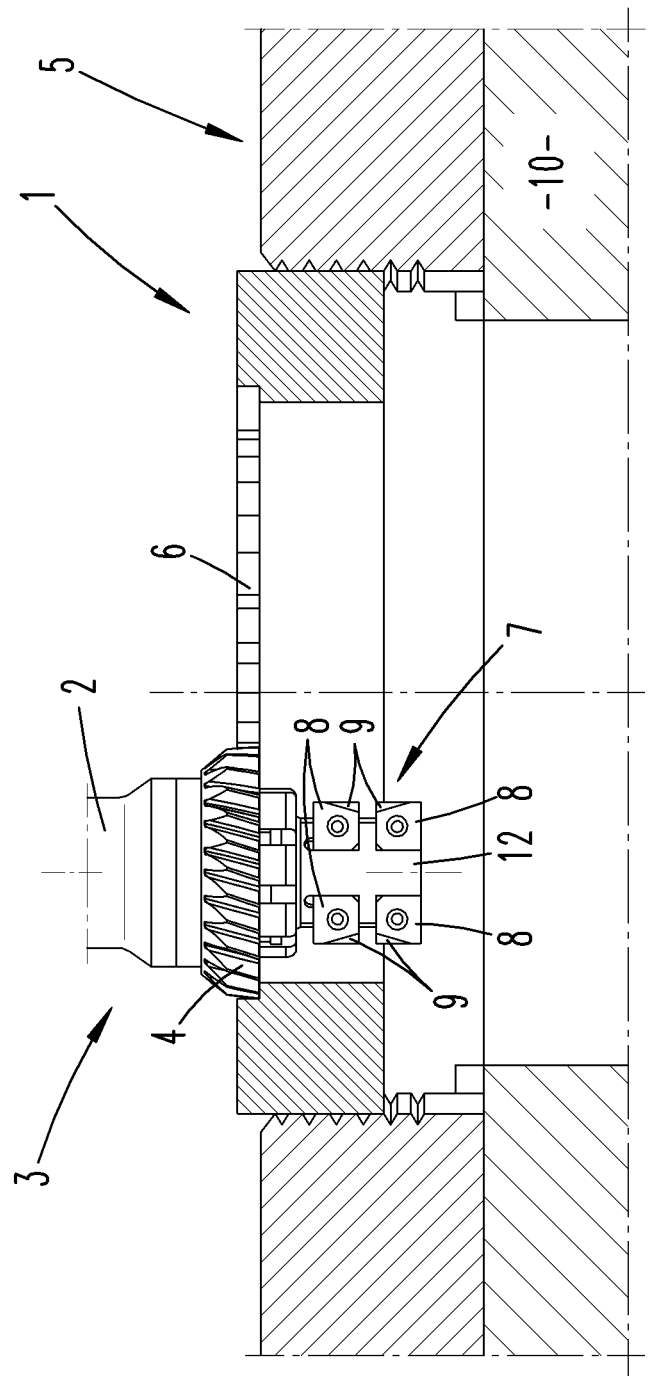

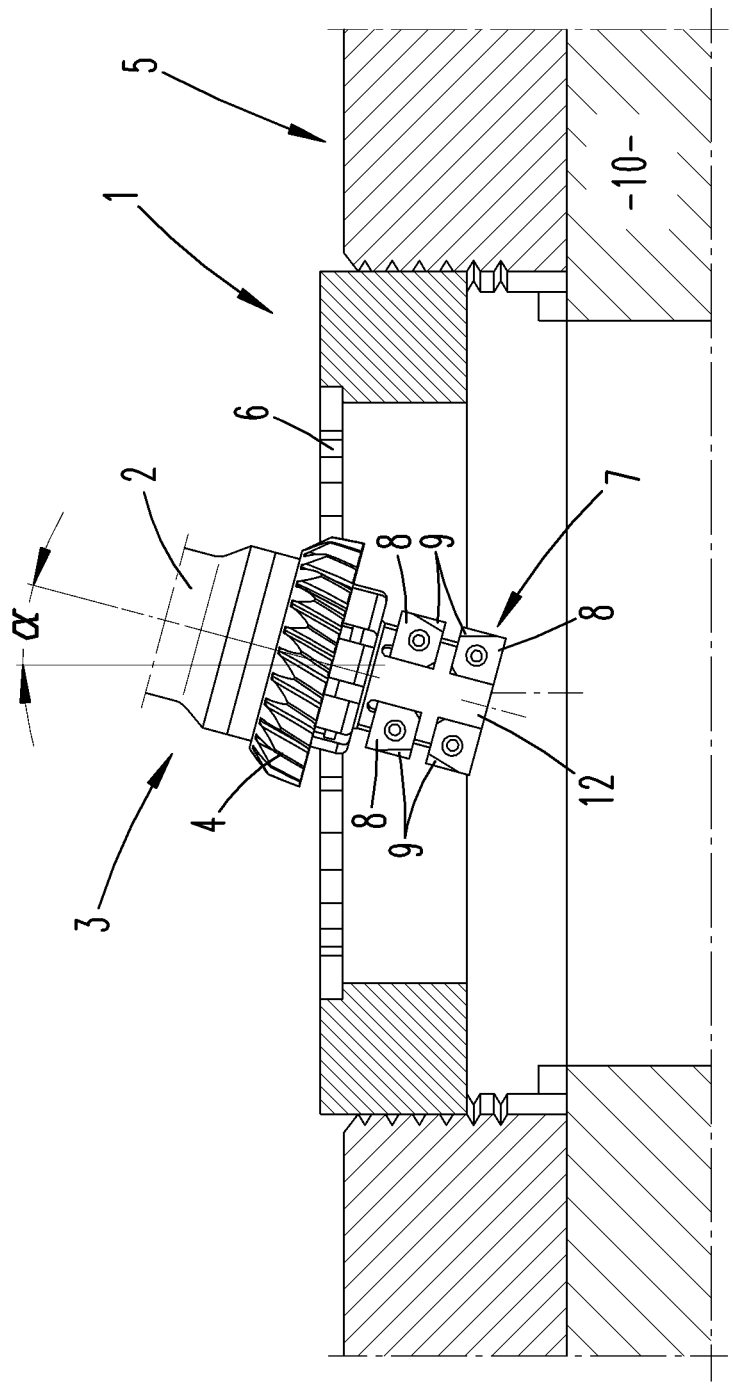

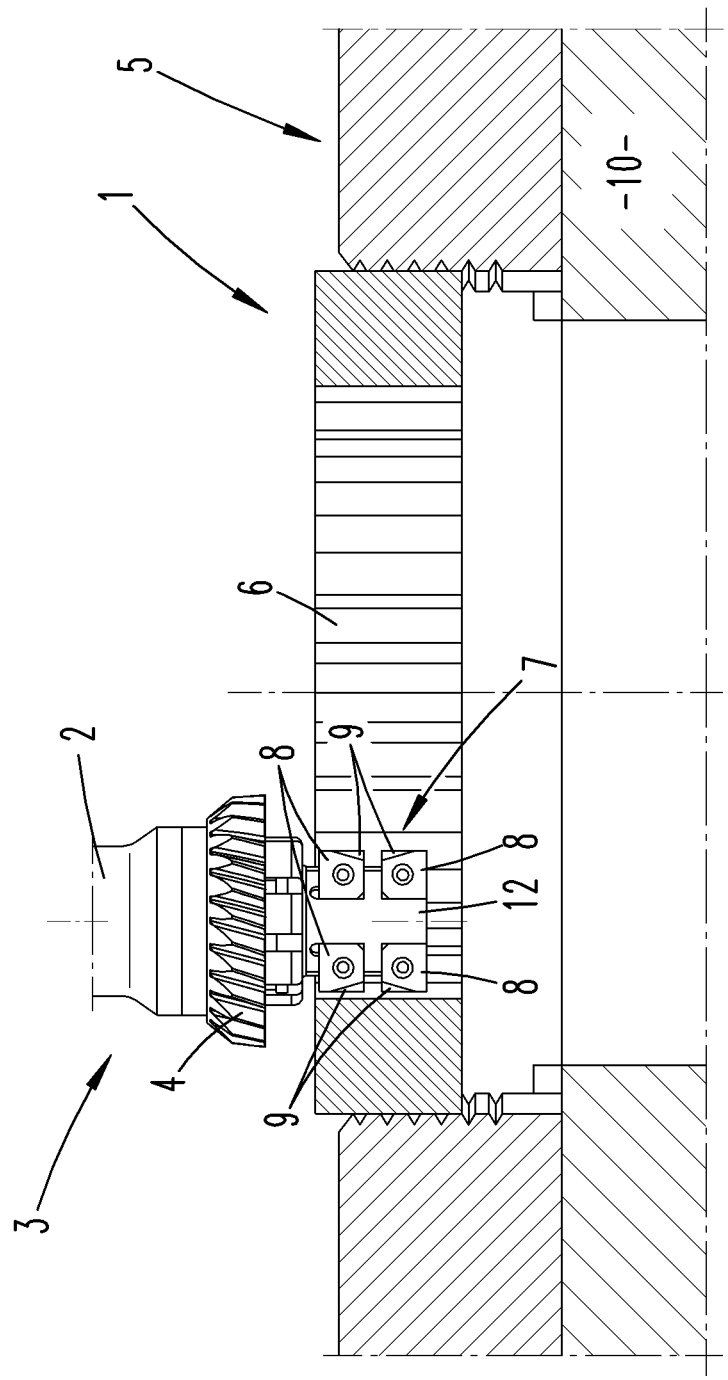

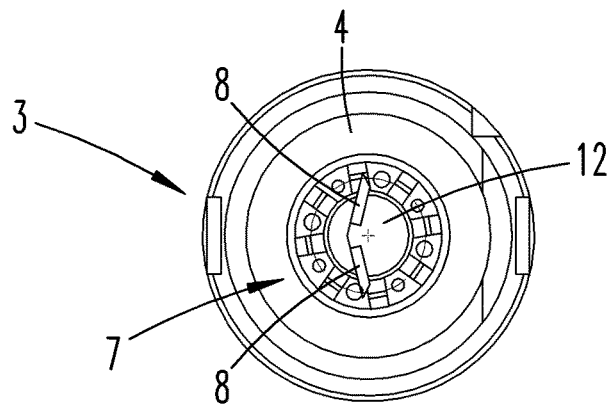
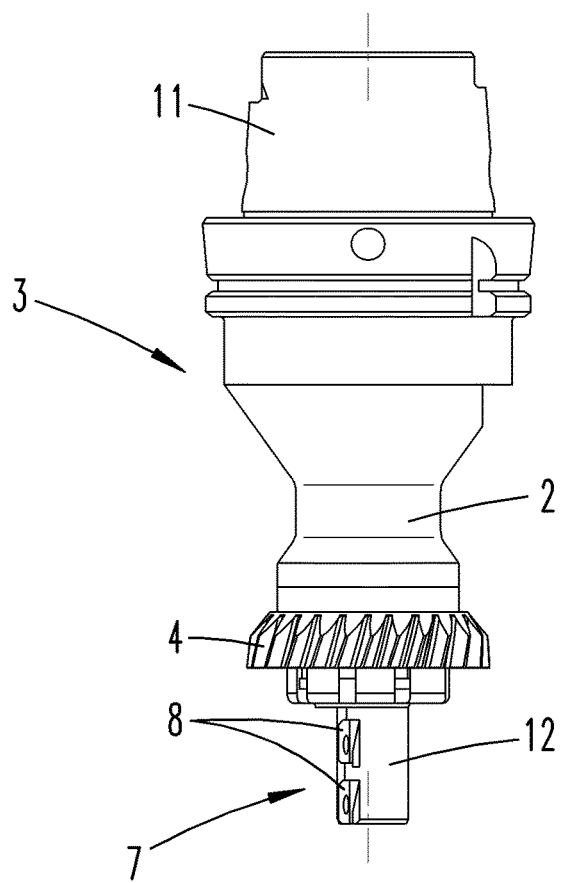

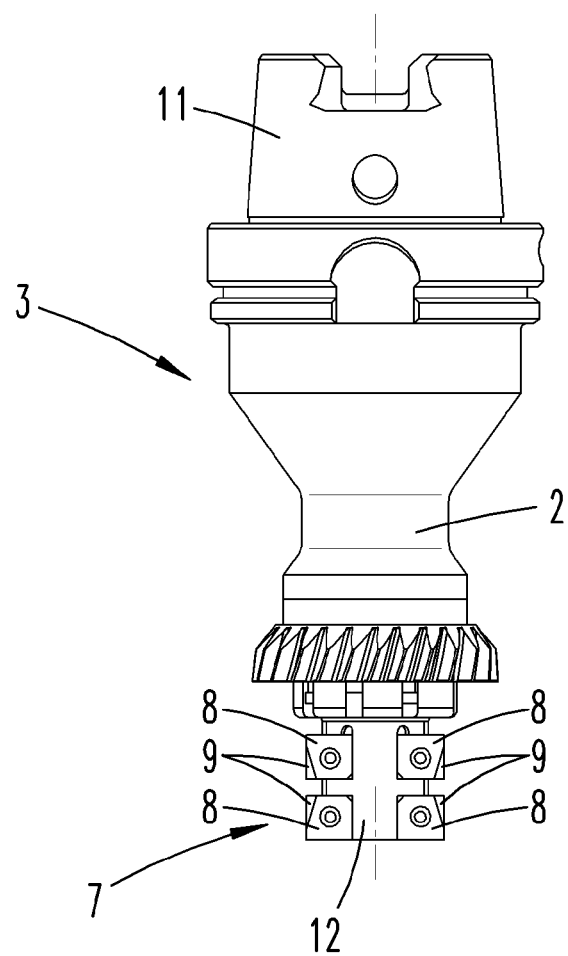

GEARING METHOD WITH TOOTH FINISHING AND COMBINATION TOOL THEREFOR

TECHNICAL FIELD

The invention pertains to a method for producing gears, in which a skiving wheel, which is rotationally driven by a tool spindle, produces a gearing in a workpiece gear, which is rotationally driven synchronously with the skiving wheel by a workpiece spindle, in a first step, wherein the workpiece spindle and the tool spindle are aligned at an axial intersection angle to one another and the advance takes place in the direction, in which the tooth flanks extend, and wherein at least a few teeth of the gearing are machined with a tooth machining tool in a second step.

BACKGROUND

DE 10 2008 037 514 A1 describes a method for gearing workpiece gears. The blank can be internally or externally geared with a skiving wheel. For this purpose, the workpiece gear is clamped on a workpiece spindle and the skiving wheel is clamped on a tool spindle. The tool spindle and the workpiece spindle are driven synchronously. The workpiece spindle axis and the tool spindle axis are aligned at an axial intersection angle to one another such that the circumferentially geared skiving wheel carries out a skiving motion, in which the cutting edges of the cutting teeth of the skiving wheel move through the workpiece in the direction, in which the teeth extend, and simultaneously carry out a rolling motion. The advance takes place in the direction, in which the teeth extend, i.e. in the direction of the workpiece spindle axis when a spur gearing is produced.

DE 199 64 396 B4 describes a method for finishing a geared workpiece gear with the aid of a tooth machining tool. The tooth machining tool respectively consists of an undercutting tool or grooving tool, by means of which the tooth flanks of the previously produced teeth can be machined.

U.S. Pat. No. 4,726,720 likewise describes a finishing method, in which geared blanks are machined with fly cutters. The fly cutters consist of scarping tools, by means of which the face edges of the teeth can be sloped.

Other methods for machining already geared workpiece gears are also known from the prior art, wherein primarily the tooth flanks or the end faces of the teeth are machined.

In the prior art, the first step, i.e. the gearing of a non-geared blank, is carried out on a first machine tool and the second step, i.e. the tooth finishing, is carried out on a second machine tool. The workpiece has to be reclamped between the machining steps such that clamping errors can occur. Eccentricities and the like particularly occur because the axis of the workpiece gear does not exactly lie coaxial to the axis of the workpiece spindle for tolerance-related reasons. The tools used also have eccentricities, particularly due to tolerances.

The eccentricities of the two tools and of the workpiece clamping fixtures can disadvantageously add up. Production defects are thereby increased.

The invention is based on the objective of disclosing a method, by means of which tolerance-related production defects can be minimized.

SUMMARY

This objective is attained with the invention disclosed in the claims. The dependent claims not only represent advantageous enhancements of the method disclosed in the master claim. The individual dependent claims rather also represent independent inventive concepts.

Initially, it is essentially proposed that the tooth machining tool for the finishing process and the skiving wheel are rigidly connected to one another. The two tools form a combination tool that is carried by the same tool spindle. The machining of the gearwheel, i.e. the gearing and the finishing process, take place in a single clamping position of the workpiece gear. Since neither the workpiece gear nor the tool is removed from the associated spindle between the two machining steps, the aforementioned cumulative eccentricities caused by the reclamping operation no longer occur. In a series production, the position of the tooth machining tool relative to the skiving wheel is always constant. Potentially existing eccentricities can be compensated with the control of the axes of the machine tool. The chuck of the workpiece spindle preferably holds a non-geared or merely pre-geared blank. The gearing of the blank or the final gearing of the blank is then respectively carried out in the first step. The axis of the gearing then preferably lies exactly in the axis of the workpiece spindle. The gearing step is carried out with a skiving tool that features cutting teeth and with an advance in the direction, in which the tooth flanks of the gearing extend, wherein said skiving tool is rotationally driven synchronously with the rotation of the workpiece. In the second step, the geared blank is further processed with the tooth machining tool in the same clamping position on the workpiece spindle. The tooth flanks or the end faces of the teeth are machined in this step. To this end, the tool spindle and the workpiece spindle are also rotationally driven in synchronism. However, the speed ratio preferably differs. Furthermore, the axial intersection angles also differ in the first and in the second step. It is therefore proposed that merely the position of the tool spindle relative to the workpiece spindle and the speed ratio of the two spindles are changed between the two steps. The teeth may be machined by means of scarping, by producing undercuts or grooves or by means of universal milling or boring. Accordingly, the tooth machining tool preferably consists of a scarping tool, an undercutting tool, a grooving tool or a universal milling or boring tool. The tooth machining tool is preferably a fly cutting tool that features one or more individual fly cutters with one or more cutting edges. The cutting edges revolve about the rotational axis along a cutting envelope while the cut is produced. The cutting edges therefore consist of revolving cutting edges. The cutting envelope, along which the cutting edge of the fly cutter revolves, may have a smaller radius than the cutting teeth of the skiving wheel. In the combination tool, the skiving wheel and the tooth machining tool are arranged axially behind one another.

The invention furthermore pertains to a combination tool for use in a method of the above-described type. An essential component of this combination tool is a skiving wheel, which is rigidly connected to a tooth machining tool. The tooth machining tool may carry a fly cutter that features a cutting edge. The skiving wheel and the tooth machining tool are arranged axially behind one another, wherein the tooth machining tool is positioned on the free end of the combination tool and the skiving wheel is arranged between the clamping end and the tooth machining tool.

BRIEF DESCRIPTION OF THE DRAWINGS

An exemplary embodiment of the invention is described below with reference to the attached drawings. In these drawings:

FIG. 1 schematically shows a combination tool 3 during the gearing a workpiece gear 1, which is rigidly connected to a workpiece spindle 5, by means of skiving, FIG. 2 shows a sectional representation according to FIG. 1 that is offset by 90°—referred to the workpiece spindle 5, FIG. 3 shows a representation according to FIG. 1 during the tooth finishing process, FIG. 4 shows a bottom view of the combination tool 3, FIG. 5 shows a first side view of the combination tool 3, and FIG. 6 shows a second side view of the combination tool 3.

DETAILED DESCRIPTION

The combination tool 3 illustrated in FIGS. 4-6 has a clamping end 11, by means of which the combination tool can be clamped in a chuck of a tool spindle 2, wherein the tool spindle 2 can be rotationally driven by an electric motor. The electric motor is controlled by a control unit. The control unit also controls another electric motor for driving the workpiece spindle 5. The workpiece spindle 5 features a chuck 10, in which a workpiece gear 1 to be machined is clamped. The control unit is designed in such a way that the tool spindle 2 and the workpiece spindle 5 are driven synchronously.

The combination tool 3 features a skiving wheel 4, by means of which the blank in the form of a workpiece gear can be provided with an internal gearing 6 in a skiving process as described in DE 10 2008 037 514 A1. To this end, the tool spindle 2 and the workpiece spindle 5 are driven synchronously in such a way that the cutting teeth of the skiving wheel 4 penetrate into the tooth gaps of the gearing 6 being produced. In this case, the axis of the tool spindle 2 is aligned relative to the axis of the workpiece spindle 5 at an axial intersection angle α.

In this context, FIGS. 1 and 2 show a first machining step, in which the advance takes place in the axial direction of the workpiece spindle 5 such that a spur gearing is produced. A relative rotation is superimposed on the advance motion when a helical gearing is produced. Externally geared workpiece gears 1 can also be produced analogously.

The cutting teeth of the skiving wheel 4 point away from the clamping end 11 in the direction toward the free end of the combination tool 3, which is formed by a pin 12. The diameter of the pin 12 is smaller than the diameter of the skiving wheel 4.

The pin 12 is rigidly connected to the skiving wheel 4 and carries multiple fly cutters 8 that respectively feature a cutting edge 9. During a rotation of the combination tool 3 about its rotational axis, the cutting edges 9 revolve about the axis of the combination tool 3 illustrated in the figure along an envelope. The envelope, within which the cutting edges 9 revolve, has a smaller diameter than the cutting teeth of the skiving wheel 4.

In the exemplary embodiment, the tooth machining tool 7 arranged on the free end of the combination tool 3 is a tool for respectively producing grooves or undercuts. To this end, the tooth flank machining tool 7 illustrated in FIG. 3 is moved into a machining position. In this case, the axis of the workpiece spindle 5 extends parallel to the axis of the tool spindle 2. The second machining step illustrated in FIG. 3 is carried out after the first machining step illustrated in FIGS. 1 and 2, but the workpiece gear 1 is in the meantime not removed from the chuck and the combination tool 3 is in the meantime not removed from the tool spindle 2. The combination tool 3 and the workpiece gear 1 remain in their respective clamping positions.

In the machining step illustrated in FIG. 3, the tool spindle 2 and the workpiece spindle 5 are likewise driven synchronously, but with a different speed ratio, such that grooves or undercuts are machined into the tooth flanks of the gearing produced in the first machining step. In this case, the advance takes place in the radial direction of the workpiece spindle 5.

In an exemplary embodiment that is not illustrated in the drawings, the tooth flank machining tool 7 may consist of a scarping tool for shaping the end faces of the teeth of the gearing 6, which were previously produced in the first step.

The preceding explanations serve for elucidating all inventions that are included in this application and respectively enhance the prior art independently with at least the following combinations of characteristics, namely:

A method, which is characterized in that the tooth machining tool 7 and the skiving wheel 4 are rigidly connected to one another and form a combination tool 3, and in that the combination tool 3 remains connected to the tool spindle 2 and the workpiece gear 1 remains connected to the workpiece spindle 5 between the two steps.

A method, which is characterized in that merely the position of the tool spindle 2 relative to the workpiece spindle 5 and the speed ratio of the two spindles 2, 5 are changed between the two steps.

A method, which is characterized in that the tooth machining tool 7 is a scarping tool, an undercutting tool, a grooving tool or a universal milling or boring tool.

A method, which is characterized in that the tooth machining tool 7 is a fly cutter with one or more cutting edges, which revolve along a cutting envelope.

A combination tool, which is characterized in that a skiving wheel 4 is rigidly connected to a tooth machining tool 7.

A combination tool, which is characterized in that the tooth machining tool 7 carries a fly cutter 8 with at least one cutting edge 9.

A combination tool, which is characterized in that the skiving wheel 4 is arranged between the tooth machining tool 7 and a clamping end 11 of the combination tool 3.

A combination tool, which is characterized in that the tooth machining tool 7 is assigned to the free end of the combination tool 3, which lies opposite of the clamping end 11.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristic features of the dependent claims characterize independent inventive enhancements of the prior art, particularly in order to submit divisional applications on the basis of these claims.

The invention claimed is:

1. A method for producing gears, the method including providing a combination tool comprising a skiving wheel and a tooth machining tool, the combination tool having a clamping end and a free end, the skiving wheel being mounted more proximate to the clamping end than to the free end, and the tooth machining tool being mounted more proximate to the free end than to the clamping end, in a first step, the clamping end of the tool and the skiving wheel are rotationally driven by a tool spindle, such that the skiving wheel produces a gearing in a workpiece gear, the gearing having tooth flanks that extend in a direction, wherein in the first step, the workpiece gear is rotationally driven synchronously with the skiving wheel by a workpiece spindle, the workpiece spindle and the tool spindle are aligned at an axial intersection angle (a) to one another and an advance takes place in the direction of the tooth flanks of the gearing, in a second step, at least a plurality of teeth of the gearing are machined with the tooth machining tool, wherein the tooth machining tool is an undercutting or grooving tool and grooves or undercuts, respectively, are machined into the teeth of the gearing, wherein the tooth machining tool and the skiving wheel are rigidly connected to one another, and wherein the combination tool remains connected to the tool spindle and the workpiece gear remains connected to the workpiece spindle for the duration of the first step, to the second step, and an entire time between the first step and the second step, wherein the two machining steps are carried out with different speed ratios and axial intersection angles (a) and regarding the tool spindle and the workpiece spindle, merely the position of the tool spindle relative to the workpiece spindle and the speed ratio between the tool spindle and the workpiece spindle are changed during a time between the end of the first step and the beginning of the second step.

2. The method according to claim 1, wherein the tooth machining tool is a fly cutter with one or more cutting edges, which revolve along a cutting envelope.

3. The method according to claim 2, wherein the cutting envelope has a smaller diameter than a diameter of cutting teeth of the skiving wheel.

4. The method according to claim 1, wherein the combination tool comprises a pin at the free end, which pin has a smaller diameter than a diameter of the skiving wheel.

5. The method according to claim 1, wherein the tooth machining tool is an undercutting tool.

6. The method according to claim 1, wherein the tooth machining tool is a grooving tool.

7. The method according to claim 1, wherein the tooth machining tool is a milling tool.

* * * * *